United States Patent Office 3,143,793
Patented Aug. 11, 1964

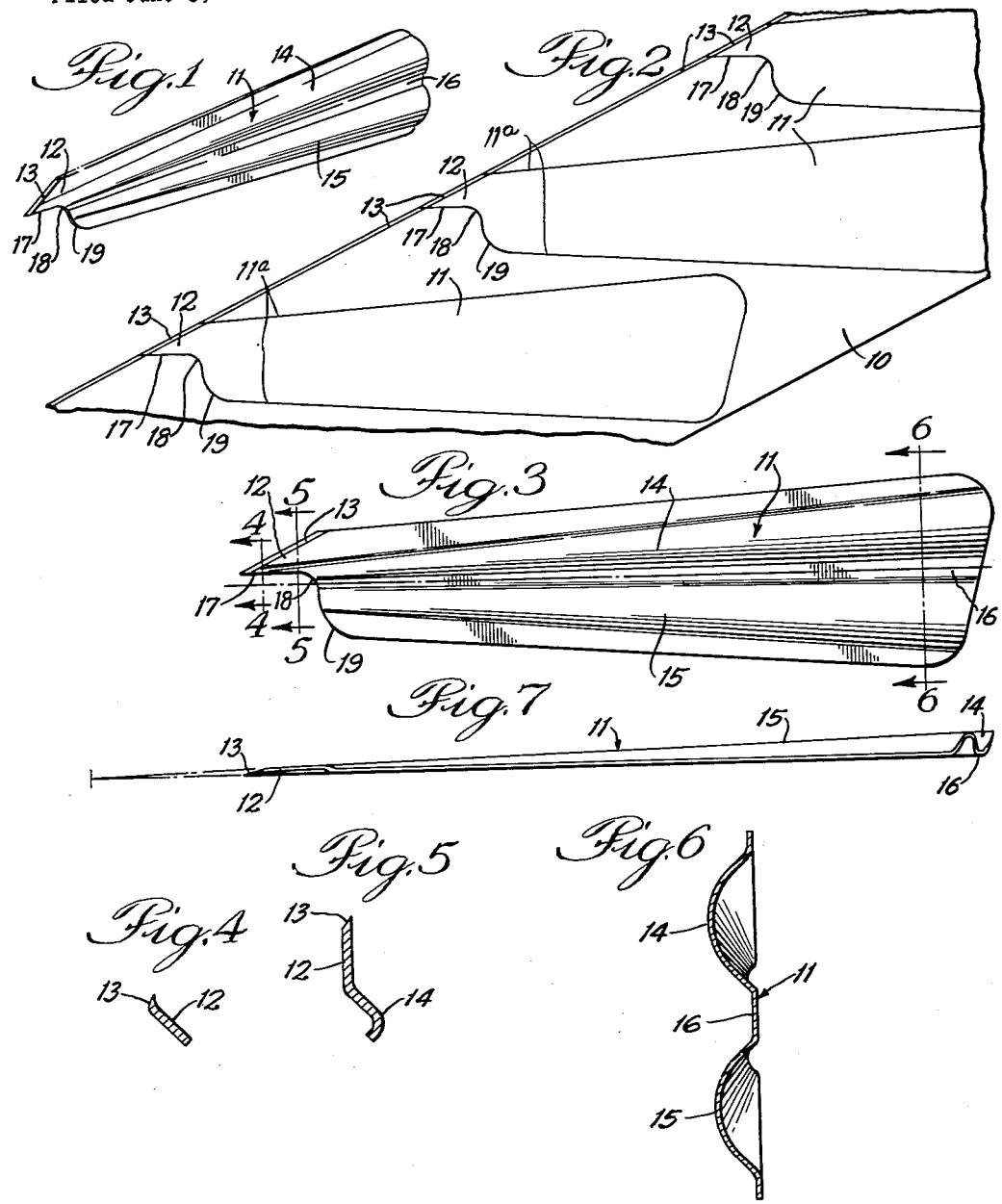

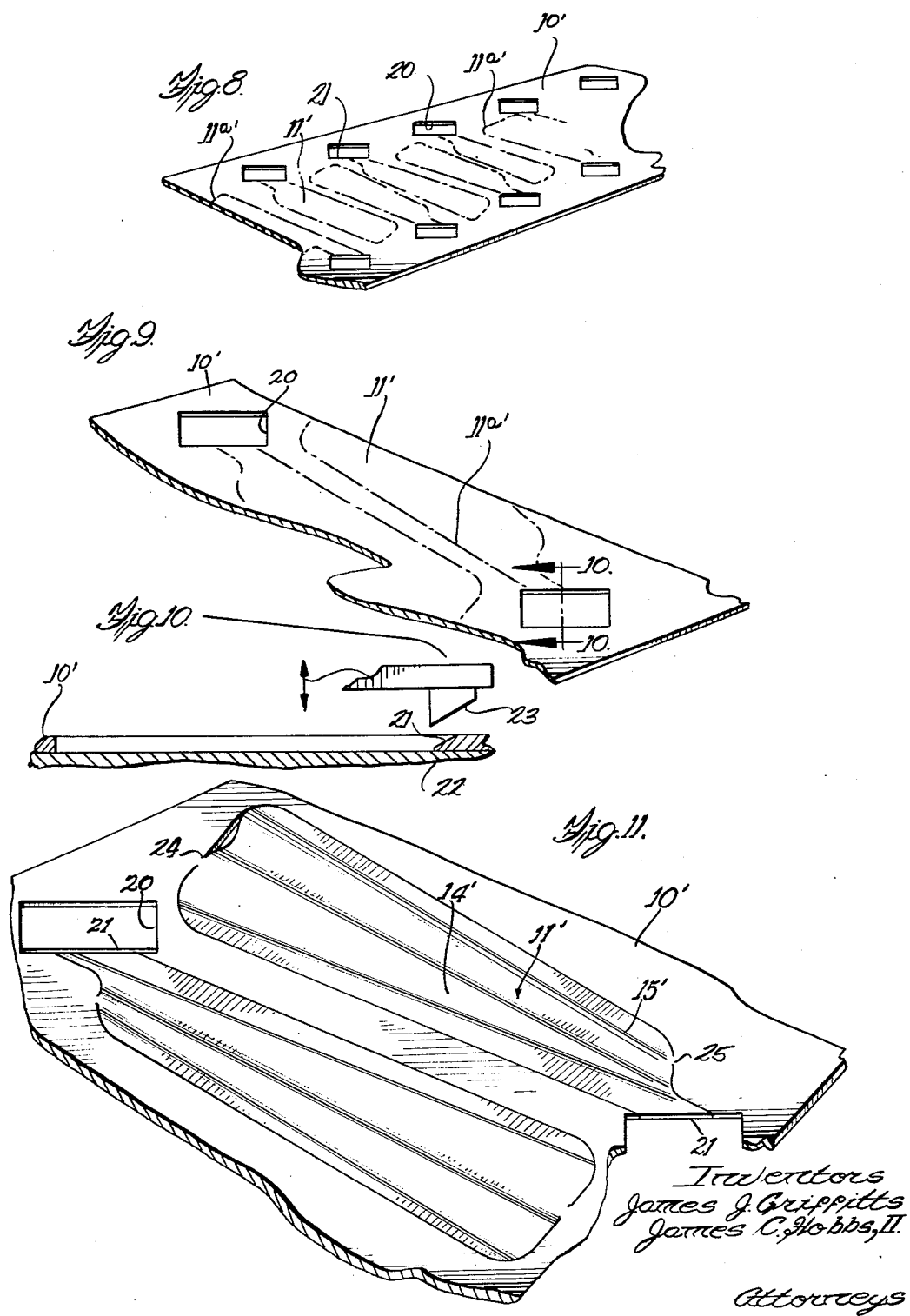

3,143,793
METHOD OF FORMING A LANCET
James J. Griffitts, Miami Shores, and James C. Hobbs II, Miami, Fla., assignors to Dade Reagents, Inc., Miami, Fla., a corporation of Florida
Filed June 8, 1962, Ser. No. 201,156
6 Claims. (Cl. 29—417)

This invention relates to a method of forming a lancet, and more specifically, to a method of forming an instrument particularly useful as a single-use blood-letting device for the collection of small amounts of blood for test purposes.

The present application is a continuation-in-part of our copending application Serial No. 54,965, filed September 9, 1960 now Patent No. 3,060,937, granted October 31, 1962.

An object of the present invention is to provide a highly effective and economical method of forming a sharply-pointed lancet having a cutting edge extending to the point thereof. Another object is to provide a method of forming a plurality of such lancets from a single sheet or strip of material of low ductility. Another object is to provide a high-speed method of forming lancets from sheet material, such lancets having sharply-pointed ends and work-hardened cutting edges.

Another object is to provide a method for forming a lancet having directional resistance for increasing the action of the cutting edge thereof, whereby the maximum number of blood vessels may be cut with a minimum surface lineal cut. Another object is to provide a method of forming a lancet having a cutting blade which allows an instrument in a single plane to progress into a three-dimensional cut, the blade having a section modulus that increases approximately in proportion to the depth of penetration and which produces a gaping wound in proportion to penetration depth. Yet another object is to provide a method for forming a lancet having a maximum finger area for grasping the lancet while stabilizing the fingers for a desired angle of thrust.

A further object is to provide a method of forming a lancet having a rib-supported point and a curved or tapered stop area between the point and the main body of the lancet for the elimination of stress which, in turn, reduces the possibility of a fracture occurring between the cutting portion of the lancet and handle in material of low ductility. A still further object is to provide a method of forming a lancet having a flared handle portion for maximal finger frictional contact and a maximal exposed area, while tending to conceal the point of the lancet. Still another object is to provide a method for forming a lancet having a plurality of flutes or ribs extending longitudinally of the lancet body, increasing the grip area thereof and providing additional purchase for the fingers, the flutes tapering to a fixed point both in the angle and taper to give maximum section modulus possible at the junction of the handle and blade. Yet a further object is to provide a method of forming a flute-reinforced lancet having the advantages set out hereinafter. Other specific objects and advantages will appear as the specification proceeds.

The invention is shown, in illustrative embodiments, by the accompanying drawing, in which:

FIGURE 1 is a perspective view of a lancet formed by the method of the present invention;

FIGURE 2 is a broken top plan view of a strip of metal being processed for the forming of lancets;

FIGURE 3, a top plan view of an individual lancet;

FIGURE 4, a sectional detail view, the section being taken as indicated at line 4—4 of FIGURE 3;

FIGURE 5, a sectional detail view, the section being taken at line 5—5 of FIGURE 3;

FIGURE 6, a sectional detail view, the section being taken as indicated at line 6—6 of FIGURE 3;

FIGURE 7, a side elevational view of a lancet;

FIGURE 8, a broken perspective view of a strip after perforation in an initial step in a modified method of the present invention;

FIGURE 9 is an enlarged broken perspective view of the perforate strip following a second step of the modified method;

FIGURE 10 is a broken sectional view taken generally along line 10—10 of FIGURE 9 and still further enlarged, such view illustrating in addition the elements involved in performing the second step of the modified method;

FIGURE 11 illustrates in enlarged perspective form a strip after the lancets have been die-cut and formed, and just prior to complete separation of the lancets from the strip.

Referring to FIGURES 1–7, the numeral 10 designates a single sheet of metal such as, for example, cold-rolled stainless steel or other metal of low ductility. The lancets to be formed from the sheet are designated generally by the numeral 11 and are outlined by definition lines 11a. As shown in FIGURE 2, the body of the lancet 11 may be formed at an inclination with respect to the edges of the metal strip 10 and with the point 12 of the lancet having a common edge with the edge of the strip 11. The lancets 11 are sharpened before they are punched free from the strip or sheet and each lancet has a cutting edge 13 formed as a section of the sharpened edge of the sheet 10. It is to be understood, however, that the method of manufacture and the procedure may be varied, as long as the side edge 13 of the sheet is sharpened prior to separation of the lancets. In the grinding operation, for example, the entire edge of the sheet may be ground, as illustrated in FIGURE 2, or, if desired, only the edge portions in the vicinity of the cutting edges of the lancets to be formed from the sheet may be sharpened, leaving the edge portions between the lancets unsharpened.

In either of the above operations the edges 13 of the lancets are sharpened before separation from sheet 10 and, therefore, by this means an effective grinding of the edges of a large number of lancets can be effectively accomplished in one operation. Following sharpening of the side edge of the strip, the lancets 11 are die-cut along definition lines 11a. The individual lancet bodies 11 may be separately removed from the metal strip and stamped to provide flutes therein, as will be described more effectively hereinafter, or such flute-forming operation may be accomplished while the lancets are still held by the sheet 10 and prior to the completing of the die-cutting and removal thereof.

The finished lancet is provided with a plurality of flutes or ribs as can be seen best from FIGURES 1, 3 and 6. A large flute 14 extends from the rear flared portion of the lancet body forwardly into the point 12 of the lancet so as to reinforce the point up to the very tip thereof. It will be noted that the rib 14 extends at an inclination to the main body and at an inclination to the cutting edge 13 of the lancet. A second rib or flute 15 extends from the rear of the lancet body and inwardly and forwardly in an inclined direction toward the rib 14. The flutes or ribs 14 and 15 are relatively wide at the rear flared end 16 of the lancet, and narrow as they approach the forward end of the lancet.

As shown in FIGURE 3, the point 12 of the lancet is acutely tapered and has on one side the inclined sharpened edge 13 and on the other side an unsharpened, rearwardly-extending edge 17 terminating in a curved corner portion 18. The resulting point is substantially in the shape of a right triangle, with the sharpened edge forming one side the hypotenuse of the triangle and the unsharpened edge portion 17 the other side thereof. The curved neck portion 18 provides, with the adjacent portion 19 of the lancet, a stop or depth-limiting shoulder.

In operation, the lancet point, with the inclined rib and sharpened edge, provides directional cutting both on the surface and below the surface, causing not only immediate penetration, but also lateral cutting so that with a minimum surface linear cut, there is a maximal number of blood vessels severed by the cutting edge below the surface. The inclined rib 14 not only reinforces the cutting point during penetration, but also provides a resistance, causing lateral cutting and further the additional function of simultaneously opening the wound to promote free bleeding. Thus, while the free bleeding is promoted at the time of collecting the blood for test by the angular position of the flute or rib extending along the point, as illustrated best in FIGURES 4 and 5, quick healing also results because of the small area of surface cutting in a lateral direction.

As shown in FIGURES 3, 4 and 5, the point has an entrance in a single plane, and this progresses into a three-dimensional wound so that the compound curvature produces a gaping outlet from the cut area for quick or free bleeding, while at the same time the small area traversed by the cutting edge 13 enables the wound to quickly heal. Further, in the foregoing action, the curved neck portion 18 provides a gradual stop or limit to the depth of penetration. With this structure, there are no sharpened or exposed corners to break during the piercing operation.

The wide or flared handle portion of the lancet provides a wide gripping surface and allows the blade to be grasped by the fingers and held firmly while at the same time the flutes, as they taper forwardly, reinforce the forward thrusting portion of the lancet, with the result that the small end of the lancet is substantially concealed during the blood-letting operation.

FIGURES 8–11 illustrate an alternative method of forming the lancet already described. In this modified operation, the metal strip 10' is first cut to form at least one series of spaced openings or apertures 20 adjacent a side edge of the strip. In the illustration given, two series of such openings are provided, one along each side edge of the strip.

While the openings are shown as being of rectangular shape, other shapes may be provided as long as the inner edge 21 of each opening is substantially straight. It is this edge of each opening which is treated to form the cutting edge of a lancet. While various sharpening techniques might be used, it has been found that a coining operation is particularly effective. In such a coining operation, the strip 10' is supported upon a surface 22 and the edge 21 is struck with a coining die 23 which bevels the edge 21 to form a sharpened cutting edge (FIGURE 10). An important advantage of the coining operation is that it results in a work-hardening of the sharpened edge 21 and such edge is therefore more resistant to dulling when the lancet is used.

Following the coining operation, the lancets are partially cut from the strip or sheet along definition lines 11a. After the partial die-cutting, the lancets, held in place only by integral connections 24 and 25 (FIGURE 11) are stamped or formed into the contour already described and the connecting portions are then severed to release the completed lancet in the form illustrated in FIGURE 1.

While the forming of the ribs 14' and 15' preferably occurs before the lancets 11' have been fully detached from the strip 10', it is to be understood that this sequence may be reversed and that, if desired, the ribs may be formed after the lancets are fully detached.

In the method described in connection with FIGURES 8 through 11, as well as in the method represented by FIGURE 2, cutting edges are formed on the strip before the lancets are die-cut. In addition, the cutting edge or edges formed on the sheet are substantially longer than the edges of the lancets. In other words, the sharpened side edge portion 13 of strip 10 is longer than the combined length of the cutting edges of lancets 11 and, similarly, the length of each edge 21 of strip 10' is greater than the length of the cutting edge of the lancet to be die-cut from that strip to insure the production of lancets having uniformly and highly sharpened edges and tips for cutting the flesh.

While the method described with reference to FIGURE 2 may involve the sharpening of edge 13 by grinding, it is to be understood that this edge may be sharpened and work-hardened by a coining operation as described in connection with the modified method. Further, where the sharpened edges are formed by coining, it has been found that a progressive die may be advantageously used to coin the cutting edges and to form and punch the lancets.

While in the foregoing specification we have set forth two methods of forming lancets in considerable detail, it will be understood that such details of procedure may be varied by those skilled in the art without departing from the spirit of the invention.

We claim:
1. In a method of forming a plurality of lancets from sheet metal, the steps of forming at least one sharpened edge on a single thin sheet of metal, and thereafter die-cutting said sheet along oblique lines intersecting the sharpened edge thereof to define a plurality of acutely-tapered lancet points each having as its cutting edge a portion of said sharpened edge of said sheet.

2. The method of claim 1 in which there are the additional steps of forming ribs in said lancet, and thereafter punching said formed lancet free from said sheet.

3. In a method of forming a plurality of lancets from sheet material, the steps of coining at least one edge portion of a thin metal sheet to form a sharpened edge, die-cutting said sheet along oblique lines intersecting the sharpened edge thereof to form a plurality of acutely-tapered lancet points each having as its cutting edge a portion of said sharpened edge, and thereafter forming longitudinal ribs in each of said lancets.

4. In a method of forming a plurality of lancets from a single strip of cold-rolled stainless steel, the steps of perforating said strip to form a plurality of spaced openings therealong, sharpening the edges of said openings to form sharpened cutting edges therealong, and die-cutting said sheet along lines intersecting said sharpened cutting edges intermediate the ends thereof to form a plurality of acutely-tapered lancet points each having as its cutting edge a portion of a sharpened cutting edge of one of said openings.

5. In a method of forming a plurality of lancets from a single strip of cold-rolled stainless steel, the steps of perforating said strip to form a plurality of spaced openings therealong, sharpening the edges of said openings to form sharpened cutting edges therealong, partially die-cutting individual lancets within said strip to form points and to bring one edge of each point in line with a sharpened edge of one of said openings, said partially die-cut lancets remaining connected to said sheet by integral connecting portions at opposite ends of each lancet, forming longitudinal ribs in each of said lancets, and thereafter severing said connecting portions to detach said lancets from said strip.

6. In a method of forming a plurality of lancets from sheet material, the steps of coining the edges of perforations of a thin metal sheet, partially die-cutting a plurality of lancets from said sheet, each of said lancets having a point with a cutting edge comprising a portion of a sharpened edge of one of said perforations, said partially die-cut lancets remaining connected to said sheet by integral connecting portions at opposite ends thereof, then forming longitudinal ribs in each of said lancets, and thereafter completely severing said lancets from said sheet.

References Cited in the file of this patent

UNITED STATES PATENTS

| | | |
|---|---|---|
| 265,959 | Hart | Oct. 17, 1882 |
| 1,942,025 | Frost | Jan. 2, 1934 |
| 2,168,406 | Harris | Aug. 8, 1939 |
| 2,626,454 | Richardson | Jan. 27, 1953 |
| 2,706,482 | Griffitts | Apr. 19, 1955 |
| 3,015,876 | Hutt | Jan. 9, 1962 |